Figure 1:
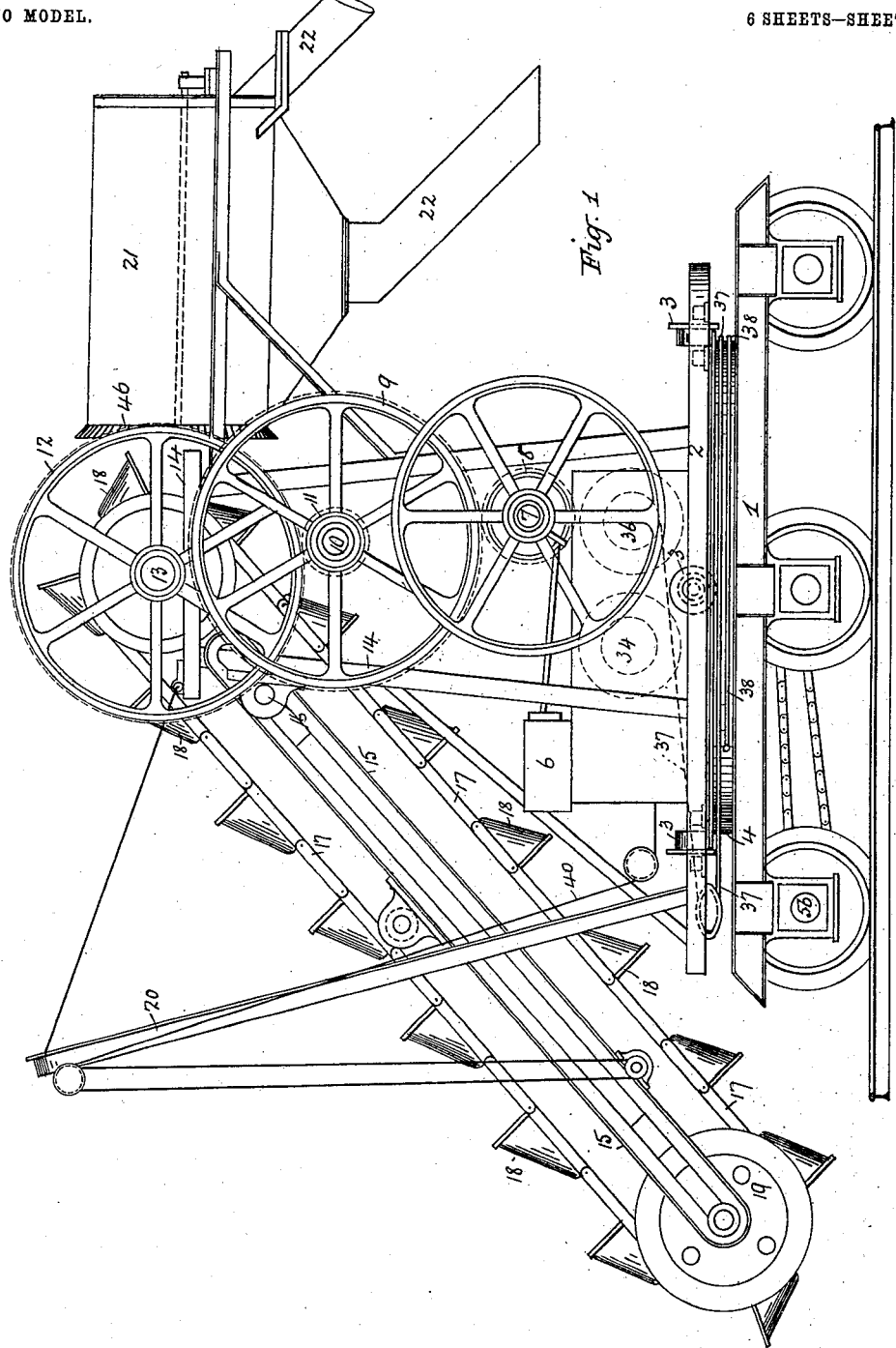

No. 750,005. PATENTED JAN. 19, 1904.
H. QUERTIER.
MACHINE FOR EXCAVATING, RAISING, SCREENING, AND FILLING GRAVEL BALLAST OR THE LIKE.
APPLICATION FILED NOV. 17, 1903.
NO MODEL. 6 SHEETS—SHEET 1.

WITNESSES

INVENTOR
Hilary Quertier
BY Richards
ATTORNEYS.

No. 750,005. PATENTED JAN. 19, 1904.
H. QUERTIER.
MACHINE FOR EXCAVATING, RAISING, SCREENING, AND FILLING GRAVEL BALLAST OR THE LIKE.
APPLICATION FILED NOV. 17, 1903.
NO MODEL. 6 SHEETS—SHEET 2.

WITNESSES
INVENTOR
Hilary Quertier
BY
ATTORNEYS

No. 750,005. PATENTED JAN. 19, 1904.
H. QUERTIER.
MACHINE FOR EXCAVATING, RAISING, SCREENING, AND FILLING GRAVEL BALLAST OR THE LIKE.
APPLICATION FILED NOV. 17, 1903.
NO MODEL. 6 SHEETS—SHEET 3.
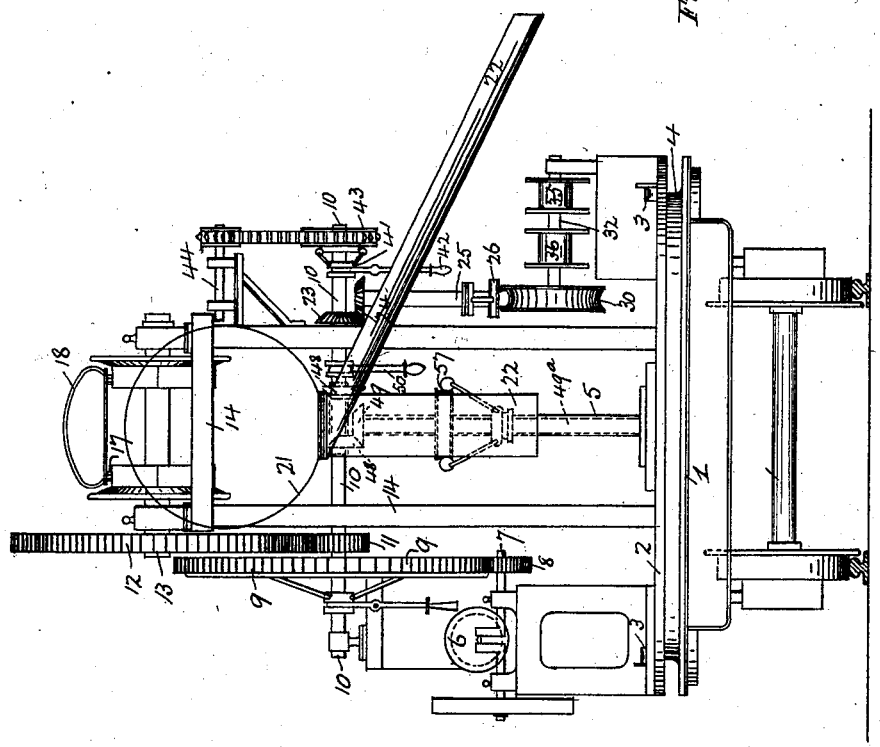
WITNESSES
INVENTOR
Hilary Quertier
By Richardson
ATTORNEYS No. 750,005. PATENTED JAN. 19, 1904.
H. QUERTIER.
MACHINE FOR EXCAVATING, RAISING, SCREENING, AND FILLING GRAVEL BALLAST OR THE LIKE.
APPLICATION FILED NOV. 17, 1903.
NO MODEL. 6 SHEETS—SHEET 4.
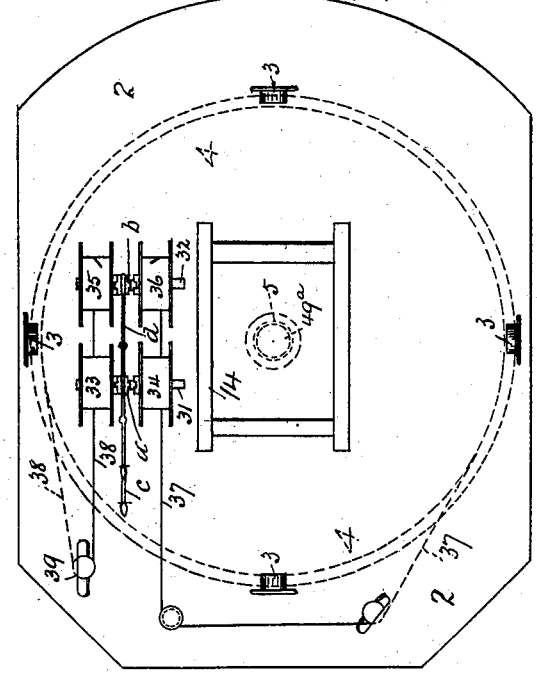
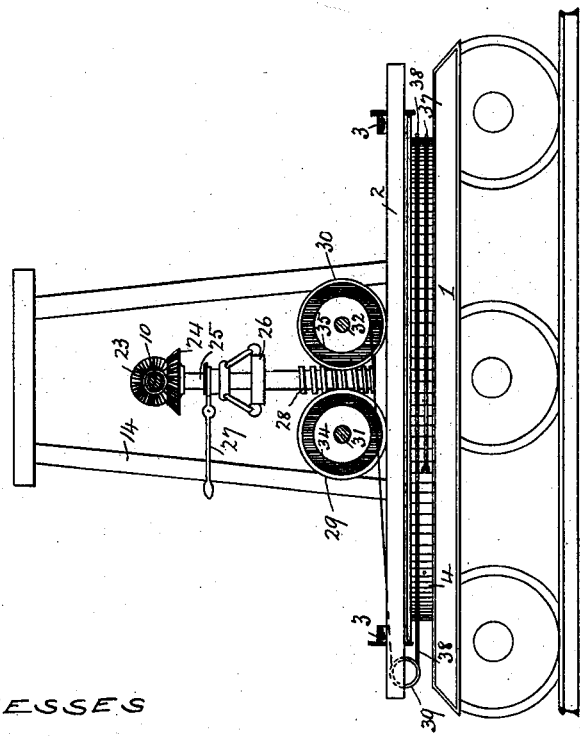
WITNESSES
INVENTOR
Hilary Quertier
BY
ATTORNEYS No. 750,005. PATENTED JAN. 19, 1904.
H. QUERTIER.
MACHINE FOR EXCAVATING, RAISING, SCREENING, AND FILLING GRAVEL BALLAST OR THE LIKE.
APPLICATION FILED NOV. 17, 1903.
NO MODEL. 6 SHEETS—SHEET 5.
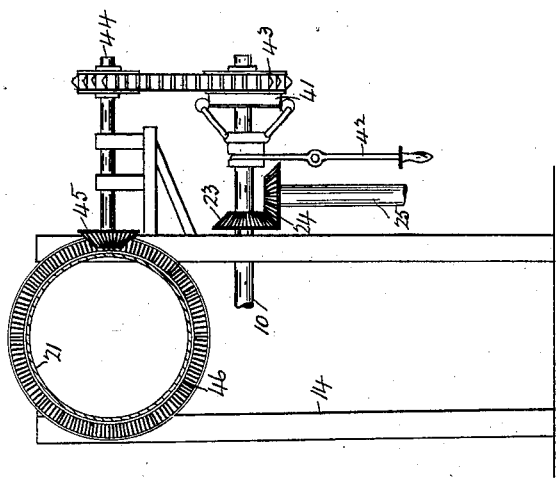
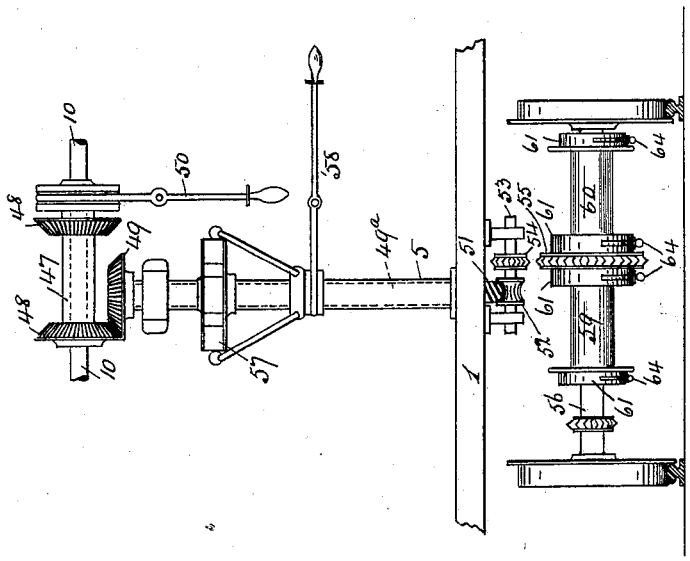
WITNESSES
INVENTOR
Hilary Quertier
BY
ATTORNEYS No. 750,005. PATENTED JAN. 19, 1904.
H. QUERTIER.
MACHINE FOR EXCAVATING, RAISING, SCREENING, AND FILLING GRAVEL BALLAST OR THE LIKE.
APPLICATION FILED NOV. 17, 1903.
NO MODEL. 6 SHEETS—SHEET 6.
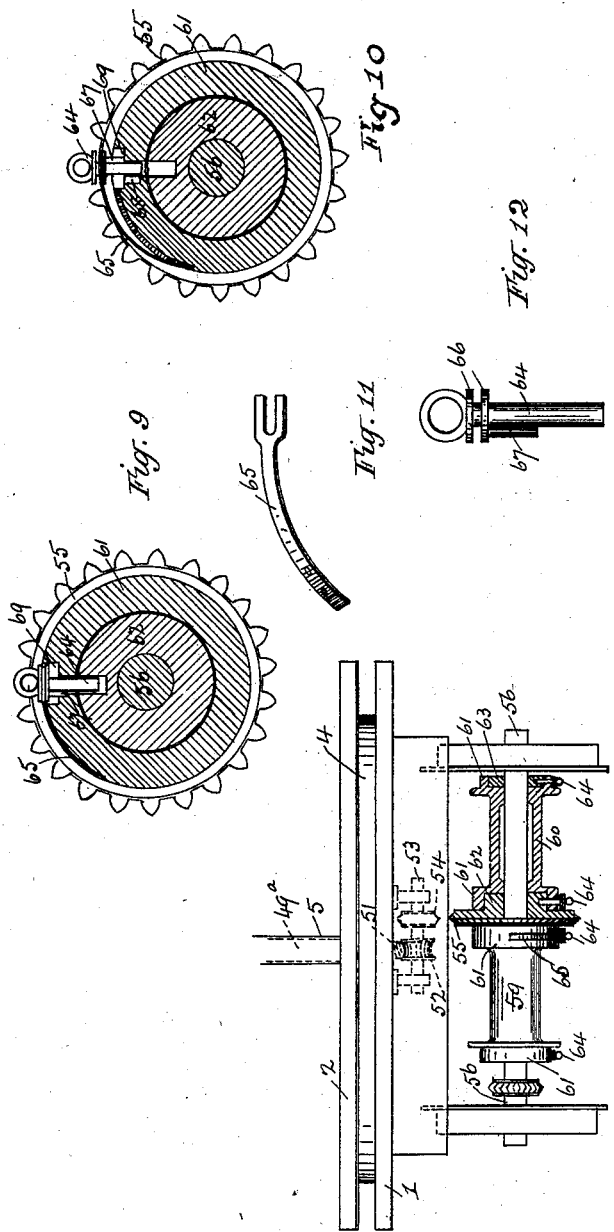
WITNESSES
INVENTOR
Hilary Quertier
BY
ATTORNEYS No. 750,005. Patented January 19, 1904.

UNITED STATES PATENT OFFICE.

HILARY QUERTIER, OF DUNEDIN, NEW ZEALAND.

MACHINE FOR EXCAVATING, RAISING, SCREENING, AND FILLING GRAVEL BALLAST OR THE LIKE.

SPECIFICATION forming part of Letters Patent No. 750,005, dated January 19, 1904.

Application filed November 17, 1903. Serial No. 181,514. (No model.)

*To all whom it may concern:*

Be it known that I, HILARY QUERTIER, engineer, a subject of the King of Great Britain and Ireland, residing at Dunedin, in the Colony of New Zealand, have invented new and useful Improvements in Machines for Excavating, Raising, Screening, and Filling Gravel Ballast or the Like; and I do hereby declare the following to be a full, clear, and exact description of the same.

My present invention refers to improvements in my machine for excavating, raising, screening, and filling gravel ballast and the like described in the specification forming part of my application for United States Letters Patent, Serial No. 143,589, filed February 17, 1903.

The invention has for one of its objects to provide novel self-contained means whereby the bucket-ladder and its operating mechanism may be swung completely round upon its truck, so that the machine will be capable of working in front or at the sides of or behind the truck.

A further part of the invention refers to self-propelling gear whereby the whole machine may be moved backward and forward along a rail-track. The self-propelling apparatus is such that the machine may be moved forward while the bucket-ladder is in operation. Means are provided for cutting the self-propelling gear in and out of operation as desired without stopping engine or motor or reversing the same. Auxiliary means are described in connection with the self-propelling gear, which are used in certain circumstances.

My improvements also refer to novel winch-gear, which has been specially devised for the purpose of this invention, and means for cutting said gear in and out of operation; and a further part of my invention has reference to the screen-driving apparatus and means for cutting the screen in or out of gear.

In order to fully describe the various parts, reference is made to the accompanying drawings, in which—

Figure 2:
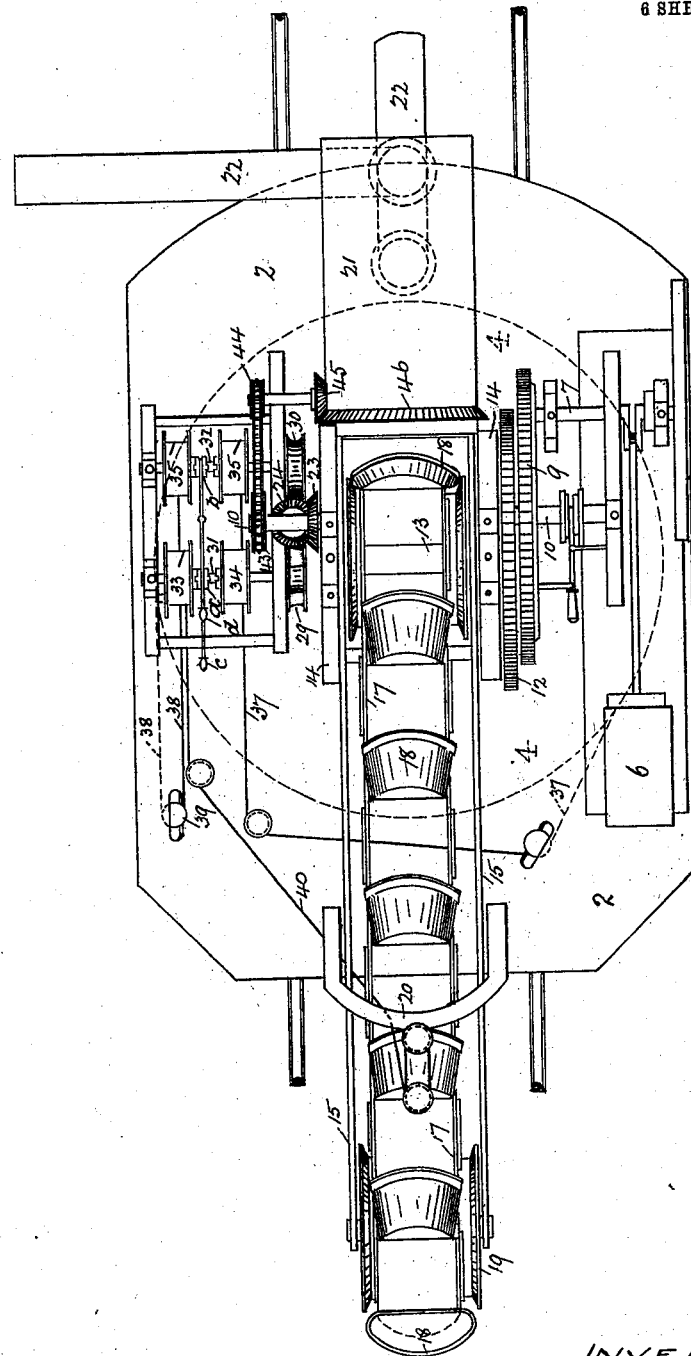

Figure 1 is a side elevation of the machine. Fig. 2 is a plan of same; Fig. 3, a rear elevation. Fig. 4 is an elevation (in part) of the self-contained portion of the winding-gear. Fig. 5 is a plan of same. Fig. 6 illustrates the self-propelling gear. Fig. 7 is a detail showing operation of screen mechanism. Fig. 8 is a view, half in elevation and half in section, of the auxiliary self-propelling gear. Fig. 9 is a sectional view taken through drum-flange and sprocket-boss. Fig. 10 is a similar view for showing pin out of gear. Fig. 11 is a view of forked spring, and Fig. 12 is a locking-pin.

Upon a suitable truck 1 is mounted the bed-plate 2 of the machine. The bed-plate has friction-rollers 3, that support it upon a circular turn-table 4, that is rigidly attached to the truck 1. Means are provided, as hereinafter to be described, whereby the bed-plate 2 and its superstructure can be turned around upon the turn-table about a king-post 5.

6 is a suitable engine or motor that operates engine-shaft 7, upon which is mounted a spur-pinion 8, that gears with a spur-wheel 9, mounted upon the shaft 10 in common with another spur-pinion 11, that gears with the spur-wheel 12 upon the upper tumbler-shaft 13, which is mounted upon a suitable framing 14. The bucket-ladder 15 is pivotally connected to the tumbler-framing at 16, and the ladder carries an endless chain 17, to which buckets 18 are attached. The lower tumbler 19 is mounted in the lower end of the ladder 15. The lower end of the bucket-ladder is suspended from the gauntree 20, and suitable hoisting-gear is provided whereby the ladder can be elevated as desired. The suitably-supported screen 21 receives the material as it falls from the uppermost bucket, and the stuff is conveyed away through swiveling chutes 22, that are placed in the screen.

Referring particularly to Figs. 1, 2, 4, and 5, these figures illustrate my turning mechanism, Fig. 4 looking from the top side of Fig. 2 the better to show the winding-drums, which are in section. Shaft 10, which will be called the "first-motion" shaft, is fitted with bevel-wheel 23, which meshes with a similar wheel 24 upon a vertical shaft 25. The said shaft is provided with a friction-clutch 26, that is operated by a lever 27, and upon the lower end of the shaft is a worm 28, that is placed between and which gears with worm-wheels 29 and 30. The worm-wheels will thus rotate reversely to each other upon the shafts 31 and 32, whereon are likewise winding-drums 33 34 and 35 36, respectively. A line 37, attached to drum 36, is passed through suitable pulley-leads and then through a sheave-wheel set obliquely in the bed-plate 2, so as to enable it to be wound upon the waist of the turn-table 4, in which its outer end is secured. A second line 38 is wound upon drum 35, which after being passed through obliquely-set sheave-wheel 39 is wound upon turn-table waist reversely to line 37, and it is secured therein in the same way as 37. Double-acting jaw-clutches $a$ and $b$ or other equivalent means are upon drum-shafts 31 and 32, respectively, the clutch $a$ being operated by lever $c$ and clutch $b$ by lever $d$, so that either one or the other of the drums 33 and 34 and 35 and 36 can be thrown into gear with one or other of the clutches. By this arrangement of parts the bed-plate 2 and the superstructure may be turned about the king-post 5. If it is desired to turn the ladder to the right, the worm-wheels are operated and clutch $b$ thrown into gear with drum 35, so as to cause that drum to wind in line 38. At the same time drum 36 will reverse automatically, and thus pay out line 37 as the superstructure swings. By gearing the clutch $b$ with drum 36 and winding in the line 37 upon the drum a reverse movement of the bucket-ladder may be obtained. By means of the clutch $a$ the drums 33 and 34 may be cut out of gear when desired. The drum 33 will operate line 40 for the purpose of raising or lowering the bucket-ladder 15, suspended from gauntree 20. In some circumstances it might be found preferable to attach the outer ends of the lines 37 and 38 to some stationary object from the machine-body; but in most cases the arrangement described will be found to answer best. Upon a continuation of the first-motion shaft 10 is a friction-clutch 41, operated by a lever 42. (Shown in Figs. 3 and 7.) Said clutch is integral with a sprocket-wheel 43, that communicates motion through a suitable chain and second sprocket to a counter-shaft 44. A bevel-wheel 45 is upon shaft 44, which gears with a similar wheel 46 upon head of screen 21, thereby rotating it. The screen may be cut in or out of gear, as desired, by the operation of the friction-clutch 41.

Referring now particularly to Figs. 6 and 3 of the drawings, mounted upon first-motion shaft 10 is a sleeve 47, slidable thereupon and revolving with the shaft, whereon are mounted bevel-wheels 48, that may each in turn be brought to gear with bevel-wheel 49 upon the vertical self-propelling shaft $49^a$, that is within the hollow king-post 5. Said shaft $49^a$ has a worm 51 upon its lower end that meshes with worm-wheel 52, thereby operating shaft 53 and sprocket-wheel 54, that communicates its motion to sprocket-wheel 55 upon one of the truck-axles 56 through a suitable chain, or in place of the worm-wheel 51 I may employ a bevel-wheel that will gear with a second bevel-wheel upon the horizontal shaft 53, and thereby operate it in a like manner as does the arrangement above described. A friction-clutch 57, operated by lever 58, is employed upon the vertical shaft $49^a$, by means of which the operation of the bevel or worm wheels aforesaid may be stopped while the main engine or motor is still running.

Fig. 8 illustrates auxiliary means that are used when desirable with the self-propelling gear before described, as when the machine is working in tight ground or whenever the dead-weight of the structure is insufficient to keep the bucket-ladder at work at the face. In carrying out this part of my invention I employ a pair of specially-formed loose drums upon one of the truck-axles, having means thereon whereby either drum may be caused to revolve with the axle. Head and tail lines are upon the drums, the outer ends of which are secured, respectively, a little beyond the extreme limits of the cut in which the machine may be working. When the ladder is started to work, the self-propelling gear will be caused to move the machine forward, and the drum that is connected to the head line will be secured upon the axle-shaft in the manner hereinafter explained. This drum will rotate through the sprocket 55 and will wind in the head line. At the same time the other axle-drum, which is still loose upon the shaft, will pay out the tail line as the machine advances.

In Fig. 8, 59 and 60 are the loosely-mounted drums, shown the one in elevation and the other in section. The drums are specially formed with annular flanges 61, that are provided upon both the ends of the drums. The inner pair of flanges fit loosely over the boss 62 of the sprocket-wheel 55, and the outer pair of flanges are similarly disposed over solid collars 63, that are keyed upon the axle-shaft 56. When it is desired to lock a drum upon the axle, pins 64 are inserted in holes that pass through the drum-flanges and end in the sprocket boss or collar which the flanges upon the drum that is to be put into gear envelop. In order to keep the pins in position, a forked spring 65, Fig. 11, is upon each of the drum's flanges that is adapted to engage with the pins 64 and press them down upon the flanges. The pins 64 are formed with collars 66, between which the forked spring 65 will engage, and a feather 67 is also upon the pin, as shown in Figs. 9, 10, and 12, that is intended to enter a keyway 68, that is formed in the hole in the drum-flange 61, that the locking-pin enters. Figs. 9 and 10 of the drawings illustrate this arrangement in section through a drum-flange and sprocket-boss. In Fig. 9 the pin is shown in position to lock the drum on axle; but when it is desired to allow the drum to run loose the pin is withdrawn against the operation of the forked spring 65 and is then turned round, so as to allow the feather 67 to rest upon the floor of the recess 69, against which it will be held by the spring, as shown in Fig. 10. The loss of the pins through falling out as the axle revolves will thus be prevented.

With the apparatus described it will be possible to excavate material from a bank in a cutting or river-bed continuously. By means of the self-propelling gear or the head line the ladder will be kept constantly at the face, and when one sweep or cut has been finished the ladder may be swung round, so as to work over the rear quarter of the truck on the return journey. Before commencing the return-cut the truck-axle drums will of necessity be rearranged, as the head line will now be the tail line with the reversed direction of the machine.

The truck may, if necessary, be fitted with buffer and draw-bar gear for the purpose of transportation upon the railways as part of an ordinary train of cars. In such a case the ladder would be hoisted clear and its forward end lowered into a car attached to the front of the machine.

Having now described my invention, what I claim as new, and desire to secure by Letters Patent, is—

1. In a machine of the class described, and for the purpose indicated, in combination, a traveling truck, a circular turn-table thereupon, a bed-plate, friction-rollers in the plate running upon the turn-table, a king-post, winch-drums that are operated through a motor-driven shaft and worm and worm-wheels, lines upon the drums said lines passing through the bed-plate and around the waist of the turn-table reversely to each other in such a way that when one of the drums is revolved the bucket-ladder and the superstructure of the machine will be swung out of line, as specified.

2. In a machine of the class described, means for turning the superstructure upon its truck, comprising in combination, a traveling truck, a circular turn-table thereupon and a bed-plate upon the turn-table running on friction-rollers, a motor-driven shaft, a bevel-pinion upon the shaft gearing with a second pinion upon a vertical shaft, a friction-clutch on the vertical shaft operated by a lever, a worm upon the shaft end, a pair of worm-wheels upon parallel shafts with each of which the worm gears, winch-drums and double-acting clutches adapted to gear with said drums upon the worm-wheel shafts and lines upon the drums, the outer ends of said lines being wound upon the turn-table waist reversely to each other and having their ends secured therein, as specified and operating in the manner explained.

3. In a machine of the kind described, means for causing the machine to be self-propelled, comprising, in combination, a traveling truck, a hollow king-post, a vertical shaft within the king-post, a bevel-pinion upon its upper end, a motor-driven horizontal shaft, a sleeve upon the same slidable thereon and revolving therewith, bevel-wheels upon the sleeve each capable of being in turn brought to gear with said vertical shaft's bevel-pinion, means upon the lower end of said shaft for operating a horizontal shaft below the truck-floor, and a sprocket-wheel upon the last-mentioned shaft communicating motion to a second sprocket-wheel upon one of the truck-axles, as specified.

4. In a machine of the kind described, a traveling truck, a hollow king-post, a vertical shaft within the king-post, a bevel-pinion upon its upper end, a motor-driven horizontal shaft, a sleeve upon the same slidable thereon and revolving therewith, bevel-wheels upon the sleeve each capable of being in turn brought to gear with said vertical shaft's bevel-pinion, means upon the lower end of said shaft for operating a horizontal shaft below the truck-floor, a sprocket-wheel upon the last-mentioned shaft communicating motion to a second sprocket-wheel upon one of the truck-axles, in combination with loose drums upon the same axle as the driven sprocket, annular flanges upon the drum ends, bosses upon the sprocket, collars secured upon the axle-shaft that are enveloped by the flanges, and locking-pins that are inserted in holes passing through said flanges and into the bosses and collars aforesaid, substantially as described and for the purposes set forth.

5. In a machine of the kind described, the auxiliary self-propelling gear, comprising in combination, a sprocket-wheel suitably driven upon an axle of the machine's truck, winding-drums loosely mounted upon the axle, annular flanges upon the drum ends, collars secured upon the axle-shaft and bosses upon the sprocket-wheel that are enveloped by the annular flanges upon the drums, holes passing through the said flanges and ending in the bosses and collars, a recess around the top of each of the holes and a keyway therein, locking-pins that are inserted in the holes, a feather upon the pins, and forked springs secured upon the drum-flanges that engage the pins, all as described, and operating in the manner and for the purposes set forth.

6. In a machine as specified, a traveling truck, a circular turn-table thereupon and a bed-plate upon the turn-table running on friction-rollers, a horizontal shaft, motor-driven, a friction-clutch upon the shaft in connection with a sprocket-wheel on the shaft end and means for operating the clutch, said sprocket-wheel communicating its motion through a chain to a second sprocket-wheel upon a counter-shaft, a bevel-pinion upon the said counter-shaft, and a bevel-wheel upon the screen 21 gearing with the bevel-pinion upon the counter-shaft, and means for supporting the screen, as described.

7. In a machine for excavating, raising, screening and filling gravel ballast and the like, in combination, a traveling truck, a circular turn-table thereupon, and a bed-plate upon the turn-table running on friction-rollers, a tumbler-framing, a bucket-ladder pivoted thereto, means for keeping the bucket-ladder at its work, an endless chain on the ladder a gauntree for supporting the same, and buckets upon the chain, upper and lower tumblers, a motor and means for communicating its motion to the bucket-ladder and also to self-propelling gear, winch-gear and screen-operating gear; a screen receiving the material from the topmost tumbler, swiveling chutes on the screen for discharging material from the same, a king-post, winch-drums, and lines upon the drums the outer ends of said lines being wound reversely to each other upon the turn-table waist, substantially as specified.

In witness whereof I have hereunto set my hand in presence of two witnesses.

HILARY QUERTIER.

Witnesses:
F. O. BRIDGEMAN,
LOUIS H. MURRAY.